(12) United States Patent
Walter

(10) Patent No.: US 6,359,268 B1
(45) Date of Patent: Mar. 19, 2002

(54) METHOD, DEVICE AND RECEPTACLE FOR HEATING PRE-PREPARED MEALS

(76) Inventor: Hubert Eric Walter, Gluckstrasse 3, Neu-Ulm 89231 (DE)

( * ) Notice: Subject to any disclaimer, the term of this patent is extended or adjusted under 35 U.S.C. 154(b) by 0 days.

(21) Appl. No.: 09/674,376

(22) PCT Filed: Apr. 26, 1999

(86) PCT No.: PCT/DE99/01249

§ 371 Date: Dec. 29, 2000

§ 102(e) Date: Dec. 29, 2000

(87) PCT Pub. No.: WO99/55212

PCT Pub. Date: Nov. 4, 1999

(30) Foreign Application Priority Data

Apr. 27, 1998 (DE) .......................................... 198 18 831

(51) Int. Cl.[7] .............................. H05B 6/10; H05B 6/12; A47J 39/02

(52) U.S. Cl. .................. 219/622; 219/601; 99/DIG. 14

(58) Field of Search ................................ 219/622, 601, 219/620, 624, 628, 731; 99/DIG. 14; 312/236

(56) References Cited

U.S. PATENT DOCUMENTS

| | | |
|---|---|---|
| 4,776,386 A | 10/1988 | Meier |
| 5,466,915 A | 11/1995 | Meier et al. |
| 5,628,241 A | 5/1997 | Chavanaz et al. |
| 5,894,788 A * | 4/1999 | Violi et al. ............ 99/DIG. 14 |
| 5,910,210 A | 6/1999 | Violi et al. |
| 6,097,014 A * | 8/2000 | Kirsch ........................ 219/622 |
| 6,120,819 A | 9/2000 | Violi et al. |

FOREIGN PATENT DOCUMENTS

| | | |
|---|---|---|
| DE | 27 11 088 A1 | 9/1978 |
| DE | 41 16 425 A1 | 1/1992 |
| DE | 296 01 788 U1 | 6/1996 |
| DE | 296 20 603 U1 | 2/1997 |
| DE | 296 21 541 U1 | 4/1997 |
| DE | 29817272 * | 2/2000 |
| JP | 8-49854 * | 2/1996 |

* cited by examiner

Primary Examiner—Joseph Pelham
(74) Attorney, Agent, or Firm—Brinks Hofer Gilson & Lione

(57) ABSTRACT

The invention relates to a process, a device and a receptacle for heating pre-prepared meals, it being possible for these meals to be accommodated in open or closed receptacles and heated by means of induction heating coils. In the catering industry it is customary for prepared meals to be heated by known circulating air ovens, a high energy consumption and relatively long heating times having negative effects, in particular in mobile use. In the case of inductive heating of such prepared meals, it is necessary to use corresponding special kitchenware which is suitable for this purpose. The object of the invention is to achieve the heating in a highly effective manner and with good quality, with low expenditure in terms of time and energy.

The solution according to the invention is based on the fact that the items of food accommodated in the receptacles are heated by induction heating coils and hot steam in closed compartments, so that it is possible to reduce the heating time and improve the quality of the pre-prepared meals regenerated in this way.

28 Claims, 5 Drawing Sheets

METHOD, DEVICE AND RECEPTACLE FOR HEATING PRE-PREPARED MEALS

The invention relates to a method according to the precharacterizing clause of claim 1, correspondingly designed devices for carrying out this method and receptacles for heating meals by this method, it being possible to carry out a wide variety of application areas in the catering industry, such as for example the holding of banquets, serving of meals in public establishments, such as hospitals and care homes in particular, and also the serving of meals in vehicles, in particular on aircraft.

The invention is based on the method and device for heating food described in DE 27 11 088, in which the heating of the food located in closed containers takes place by means of induction heating of conducting elements in the containers.

In the case of the solution described there, the use of special food receptacles is generally necessary, as is also the case elsewhere for the inductive heating of food. The use of special kitchenware or, as likewise specified in DE 27 11 088, specially fitted-out containers or trays, the increased cost aspect of which is not generally justified, has also generally only been accepted rarely by users up until now.

Furthermore, the heating which can be achieved by induced eddy currents takes place in the known systems exclusively by means of heat conduction, convection and radiation, which, in particular in the case of convection and radiation, is hindered by the medium surrounding the food to be heated, air, so that increased time spent and reduced efficiency have to be accepted.

A further disadvantageous aspect to be noted in the case of this known solution is that it is necessary for the effectiveness of this method that the distance between the induction coils and the metallic parts actually to be heated of the containers which are intended for accommodating the food and are to be heated and their positioning are set optimally. For this purpose, a complicated mechanism is proposed there, with which the elements accommodating the induction heating coils can be set appropriately before the heating operation, at least in their height.

In particular on aircraft, it is customary to provide conventional ovens which are operated by resistance heating and with circulating air for the heating of meals. The relatively low efficiency of these known ovens results in a great expenditure of time and energy being required, which has extremely disadvantageous effects in this sector in particular. The ovens, normally standardized in their dimensions, must be manually loaded with the containers, which may also include conventional tableware, in a relatively laborious way and be heated appropriately to the desired temperature over a time period of about 20 minutes and then removed again individually, assigned individually to trays and the fully loaded trays introduced into insulating carts and transported by them to the individual passengers, where they are handed out.

Since the various catering companies also use different receptacles of different materials and in different dimensions, there may be further increased energy consumption and not optimum utilization of the space available in the ovens used there.

It is therefore the object or the invention to specify a possible way of heating prepared meals in a short time, to the extent that they are suitable for consumption, with low expenditure, in a highly effective manner and with good quality.

This object is achieved according to the invention by the features of patent claim 1. Advantageous refinements and developments of the invention emerge from the features contained in the subordinate claims.

In the invention, it is important in particular that the heating of the items of food or meals, if at all, by convection, induction or heat radiation is achieved at least also additionally by hot steam. In this way, not only can the effectiveness, i.e. the efficiency, be improved and the heating time reduced, but a regeneration of the prepared meals can also be achieved, having positive effects not only in terms of improving the esthetic appearance but also in terms of flavor.

For this purpose, one possible way of proceeding is that the steam is generated directly in a device with which the meals are to be heated or externally generated steam is introduced in an apportioned manner into such a device and, in the latter case, the temperature is maintained at an adequate level with the aid of induction, so that condensation of the steam during the heating phase can be avoided. Another possible way is that the steam is generated directly in the device during the heating, the temperature being chosen in both cases such that hot steam can be used for heating the meals.

In the most favorable case, the steam can be generated with the aid of the induction heating coils, so that it is possible to dispense with other heating systems or elements.

In a favorable way, the receptacles in which the meals to be heated are contained are placed into a corresponding device and positioned with respect to the induction heating coils, it being possible for particularly favorable induction heating coils for heat from above and below to be arranged above and below such a receptacle which contains meals to be heated.

Since, according to the invention, virtually any receptacles are to be used, in other words it is not necessary to resort to special kitchenware, it is favorable the eddy currents in electrically conducting materials (preferably ferro- or paramagnetic), which in the form of foils, foil parts or metal sheets favorably constitute part of such a heating device or of push-in containers, which will be discussed in more detail later.

In this case, the metallic sheet-like elements generally to be used in particular for the heat from above may be of a slotted or plastic-coated form, allowing an automatic regulation of power, and accordingly also the temperature, an increase in the corrosion resistance and/or heat emitting capacity.

The sheet-like elements in which the required heat for the heat from below is to be generated by induction may also be advantageously used for the generation of the steam. In this case, these parts may be designed in specific regions in such a way that they can take the water for the steam generation required for the heating and regeneration of the meals and may be designed for example in a channel-like manner and, particularly advantageously, in an annular manner around the respective receptacle.

Such foils or metal sheets may be surface-treated, in order on the one hand to improve their heat emitting capacity and on the other hand to form a corrosion protection.

In this case, the foils or metal sheets may be arranged such that they are individually assigned to an induction heating coil, or else one such element is assigned to a plurality of such coils.

There is also the possibility of using an additional induction in the receptacles containing the meals, in which such a receptacle is enclosed by a ring of a material suitable for this purpose, which can concentrate the field in the direction of the receptacle base.

It must be noted that the sheet-like element responsible for the heat from below in some, cases can absorb only certain parts of the field, if it consists for example of a relatively unfavorable material, is slotted or does not have an adequate thickness for a full skin depth, so that the remaining proportion is transferred into the base of the receptacle.

A further possibility which can be used with the solution according to the invention is that of using receptacles closed by lids, the lids consisting of an electrically conducting material, for example metal, and it being possible for them to be designed in a way similar for example to yoghurt pots. In this case, the upper edge of the receptacle and/or the lid may be designed in such a way that these receptacles can be placed or hung in a frame-shaped element, and the heating can consequently be carried out in a corresponding device. In this case, the latching of the frame-shaped element and the size of the receptacles can be optimally adapted to the surface area available for the heating, so that maximum space utilization is possible.

The steam to be used for the heating, may, however, also be generated by heating water, which can be stored for example in a porous body, which may consist at least partially of an electrically conducting material. Various sintered metal bodies with adequately large pores and pore volumes may be used for example for this purpose. Such a porous body may be designed as a ring which has a greater diameter than the respective receptacles used and into which such receptacles can be placed, here again appropriate positioning with respect to at least one induction heating coil having to be taken into consideration. The porous bodies have, furthermore, the advantage that a quite specific amount of water can be absorbed and stored in them without any great expenditure. The porous bodies may, however, also consist of some other material as a pure water reservoir and the evaporation may be achieved by utilizing heat conduction, convection and/or radiation to the bodies.

A further possible way in which water can be provided for the evaporation is that of using, for example, structures in the form of small tubes, in the cavities of which the water can be temporarily stored. The steam formed can then possibly diffuse through permeable membranes or emerge from openings. In principle there is also the possibility of keeping the water available in small exchangeable storage bottles, which are preferably arranged with their opening downward during the heating. In this way, water or externally generated steam can be filled into or passed through small tubes, in which holes are possibly temporarily closed by foils or films, advantageously of semipermeable material.

The water may, however, also be temporarily stored in receptacles consisting completely of foils or films Pure plastic films, plastic films and metal foils together or metal-coated films may be used. Such a receptacle may be a disposable product. The water or the already formed steam can emerge after manual opening of the film or foil or, in a temperature-dependent manner, after exceeding a certain temperature during heating.

For the case in which receptacles which are suitable by their design and material selection for being heated inductively are used for the meals to be heated, there is in the simplest form the possibility of keeping the water required for the steam generation available directly in such a receptacle before the heating of the meals, in which case possibly separated receptacle regions or at least partially flexible receptacles of/with film or foil material can be used for this purpose, said receptacle regions or receptacles bursting open, releasing openings or possibly disintegrating under increasing steam pressure.

If the steam which is used for heating the meals is generated directly in the receptacles, it is expedient to cover the receptacle or a region around this receptacle with a lid-like formation, preferably in a gastight manner, so that a self-contained environment is produced. This solution is suitable in particular when using already loaded, relatively large trays or similar such formations on which receptacles with various items of food or drinks can be arranged, not all of which are to be heated. This has the advantage that such a tray can be automatically pre-loaded and, following heating, no additional efforts have to be expended to bring the various items of food and drinks together to form a complete portion.

It is also important that the amount of steam required for the heating is influenced by providing a meal-specific amount of water, so that the quality of the items of food heated is not influenced negatively but positively.

By contrast with the tray solution already described, the heating of prepared meals accommodated in receptacles may also be achieved by slight modification of conventional devices, such as they are for example the circulating air ovens used up until now on aircraft. In this case, such heating devices are dimensioned at least virtually identically and are fitted out with appropriate connection possibilities for electrical energy.

The elements for controlling and operating such a heating device for meals should be arranged on a removable panel or be integrated in a door, in order to minimize the space required. Other elements, such as for example the electronics present in any case on aircraft, may also be used for the control.

The combination of heating and alternating cooling in such an oven or meal transporting cart is advantageous. Combined units in which the items of food and drinks are first cooled and only heated up immediately before consumption can be used. As a result, storage space can be saved. For the cooling, it is possible to resort to conventional principles.

The receptacles filled with meals are introduced into additional push-in containers and, preferably by their own shape and dimensioning, positioned with respect to induction heating coils in such a way that optimum heating is achieved. Such induction heating coils are arranged at least in the base of such a push-in container, it also being possible for achieving an appropriate heat from above for corresponding induction heating coils to be integrated in the upper part of such a push-in container. For the inductive heating, the base and top of such a push-in container may be provided, again as already described, with sheet-like elements which can be heated by induction. Furthermore, the steam generation can, as likewise already described, also again be achieved by virtually exclusively inductive heating in such a push-in container, which in that case is closed.

Such push-in containers may also be used for the heating/regeneration of, for example, meals already covered on plates, it also being required here for the dimensioning of the containers to conform to the customary standard sizes.

Since, as already mentioned, standard dimensions have to be observed for the heating device (ovens) and meal transporting carts with which the heated meals are transported from the heating to the place where they are actually consumed, it is expedient to dimension the receptacles used for heating in an appropriately space-optimized manner, so that the space available for the heating and transport can be utilized to the maximum. For this purpose, the surface area respectively available on one level should be almost exactly an integral multiple of the surface area requirement of individual containers, whereby an increase in the surface area utilization and capacity of up to 50% can be achieved.

Such meal transporting carts are generally insulated with respect to the outside, in order to at least hinder undesired cooling or heating of the corresponding meals contained in them. For this purpose, conventional insulating materials which achieve limited K values and bring about an increase in mass are used. In particular on aircraft, on which such meal transporting carts are usually referred to as trolleys, it is extremely favorable, however, to achieve the insulation by creating a vacuum, or at least a partial vacuum, in the walls of such a trolley. Since on aircraft the corresponding negative pressure is available above certain, altitudes and such a negative-pressure generating system is present in any case for the toilet systems customarily to be used there, at least a partial vacuum can be created by a corresponding connection, or can be readily renewed again as and when required. In this case, not only can the walls then be partially evacuated, but also the entire content of such a trolley can be at least partially evacuated if there is appropriate sealing. Furthermore, the vacuum or partial vacuum may be favorably created by means of ejectors. In a corresponding way, the push-in containers may also be subjected to a vacuum on their own or additionally.

The heating of the meals may also take place, however, directly in such a meal transporting cart, this possibility preferably being able to be used whenever already pre-loaded trays on which various items of food and drinks to be heated or kept cold are arranged.

In this case it is possible to use planar, tongue-like elements which are connected to a high-voltage frequency generator via lines and into which induction heating coils are integrated. These tongue-like elements can then be introduced into such a trolley through opened doors of at least one side, or slots formed for example in the side walls, the induction heating coils, possibly in conjunction with the planar sheet-like elements which are to be inductively heated, being arranged in a way corresponding to the positioning of the receptacles in which the meals to be heated are accommodated, so that only heated where necessary and the other items of food and drinks remain virtually uninfluenced.

Profilings, with the aid of which the positioning or meals to be heated is facilitated, may be formed on the tongue-shaped elements.

For detecting the activation of the induction heating coils and also for measuring the temperature, the chance in inductance, the impedance, the capacitance and/or the change in frequency may be taken into consideration. The corresponding sensing and/or current or voltage measurement then preferably takes place by means of the electronics for the control of the frequency generator.

Since a plurality of induction heating coils, which are not to be, or do not always have to be, used simultaneously for the healing of meals, may be arranged in the tongue-shaped elements, it is favorable to provide a so-called "pot detection", which may take place for example in the form of a measurement of inductance, impedance or capacitance.

Since the ohmic resistance and inductance of many materials changes temperature-dependently, these properties can be used for contactless temperature monitoring.

Such tongue-like elements in conjunction with the corresponding high-frequency generator may be permanently installed in buildings, but also in vehicles, so that a correspondingly pre-loaded meal transporting cart be transported to such a device, the desired meals be appropriately heated with the latter and subsequently be transported to the respective final consumer. As a result, a considerable rationalizing effect can be achieved for a wide variety of application areas.

In this case, these tongue-like elements can of course also be arranged on a plurality of levels appropriately above and below the receptacles to be heated and for example metal sheets possibly in between.

It is advantageous in any case to arrange the induction coils in removable carriers, so that they can be removed from the oven for cleaning.

The electronically controlled high-frequency generator is operated in a frequency range above the audible limit for man, normally in the range between 20 and 50 kHz, it being the case in the aviation application in particular that the electronics are preferably of a redundant configuration, appropriate filters are used on the electrical energy supply and an input of preferably 400 Hz is used there. Both the electronics and the generator should be arranged in a separate housing, which is preferably also of a suitably shielded design, in order to avoid negative influences on the surroundings.

It is favorable to arrange additional components, in particular at the top and bottom in an oven, as ferrites, in order to counteract heating of the housing and to influence the electromagnetic field (EMC protective function).

Receptacles which, in a sandwich type of construction, on the outside of a plastic, including of an foamed form (improvement of the insulation), possibly provided with a fiber reinforcement, and on the inside with metal inserts or coatings, can be used as receptacles for heating. In this case, it is particularly favorable that also the edge is enclosed above with a metallic material, so that no direct contact can occur between plastic and food, These receptacles may also be closed by a lid, likewise of such a composite material, correspondingly metallically coated or exclusively of metal.

The lid or an insert may also be provided with a separate coil, which serves exclusively for the evaporation of water. The lid or an insert of receptacles or other elements may be designed in such a way that food (for example bread), drinks or other items (hand towels) can likewise be heated on it.

The plastic and metal composite may be permanently bonded for example by lamination, injection molding, adhesive bonding. There is also the possibility, however, of using a corresponding metal insert, which can be inserted into the plastic in a shape-adapted manner. In this case, the metal insert can be removed from the plastic, stored separately and cleaned relatively easily in this form.

A further advantageous refinement of the invention can be achieved by it being possible for the various items of food, and in this case in particular also the items of food to be heated, to be detected on the basis of the receptacles used by sensors suitable for this purpose, so that heating does not take place at all or a heating regime which is optimum for the respective item of food can be selected. For this purpose, receptacles of different colors or provided with a corresponding coding may be used, so that the temperatures and heating times can be optimally selected.

It has advantageous effects if at least a partial vacuum is created by internal pressure reduction in the receptacles filled with prepared meals. As a result, it is even possible in many cases to dispense with cooling, even for several days, and for the oxidation of the food to be at least hindered. For this purpose, the receptacles may have additional connections with valves, which can be connected to a negative-pressure-generating unit (for example an ejector).

In the case of the invention, temperature measurements may also be carried out to control or regulate the respective eddy currents, and accordingly also the corresponding heating. The temperature measurement in conjunction with a time measurement ensures that the respective items of food are heated to the correct temperature and undesired impairment of the items of food by overheating can be avoided.

With the temperature measurement, the power electronics for controlling the frequency generator or the activation of individual induction coils is influenced in particular.

For this purpose, the electrical or magnetic coil parameters can be measured, for example via auxiliary coils. There is also the possibility, however, of measuring the temperature via sensors. In this case, such sensors which are contacted directly with the respective receptacles, or possibly a frame-shaped element into which the receptacles can be inserted, may be used. Pin-shaped or spring-shaped temperature measuring contacts, for example measuring on a semiconductor basis, may be used for this purpose. Pins may engage in openings in the receptacles for the measurement.

The already mentioned push-in containers, or possibly also appropriate receptacles for meals, should advantageously be differently designed with respect to width and length, so that they can only ever be introduced in a certain position into a heating device or a meal transporting cart. Their outer shaping should be such that they can also be stacked securely and with the least space requirement. Furthermore, there should be edge regions which make it possible for push-in containers or receptacles arranged in a series or next to one another to be temporarily connected to one another positively, for example by hooking.

The push-in containers should be produced essentially from high-temperature-resistant plastics, for example polyhydroxybutyrate-compostable), which have at their lateral edges electrodes which serve as contacts. Via these electrodes, the high-frequency electrical energy can pass from the outside to the induction heating coils arranged in the base or in the top region, via connecting lines likewise integrated there. These electrodes may at the same time serve for keeping the push-in containers in connection with counterelectrodes arranged in the housing of an oven.

The induction heating coils are advantageously arranged and connected both in series and in parallel.

With the invention it is possible to reduce the time for adequate and optimum heating of meals in the catering industry by at least 50% and also to achieve a considerable increase in efficiency.

The invention is to be described in more detail below on the basis of exemplary embodiments.

Figure 1:
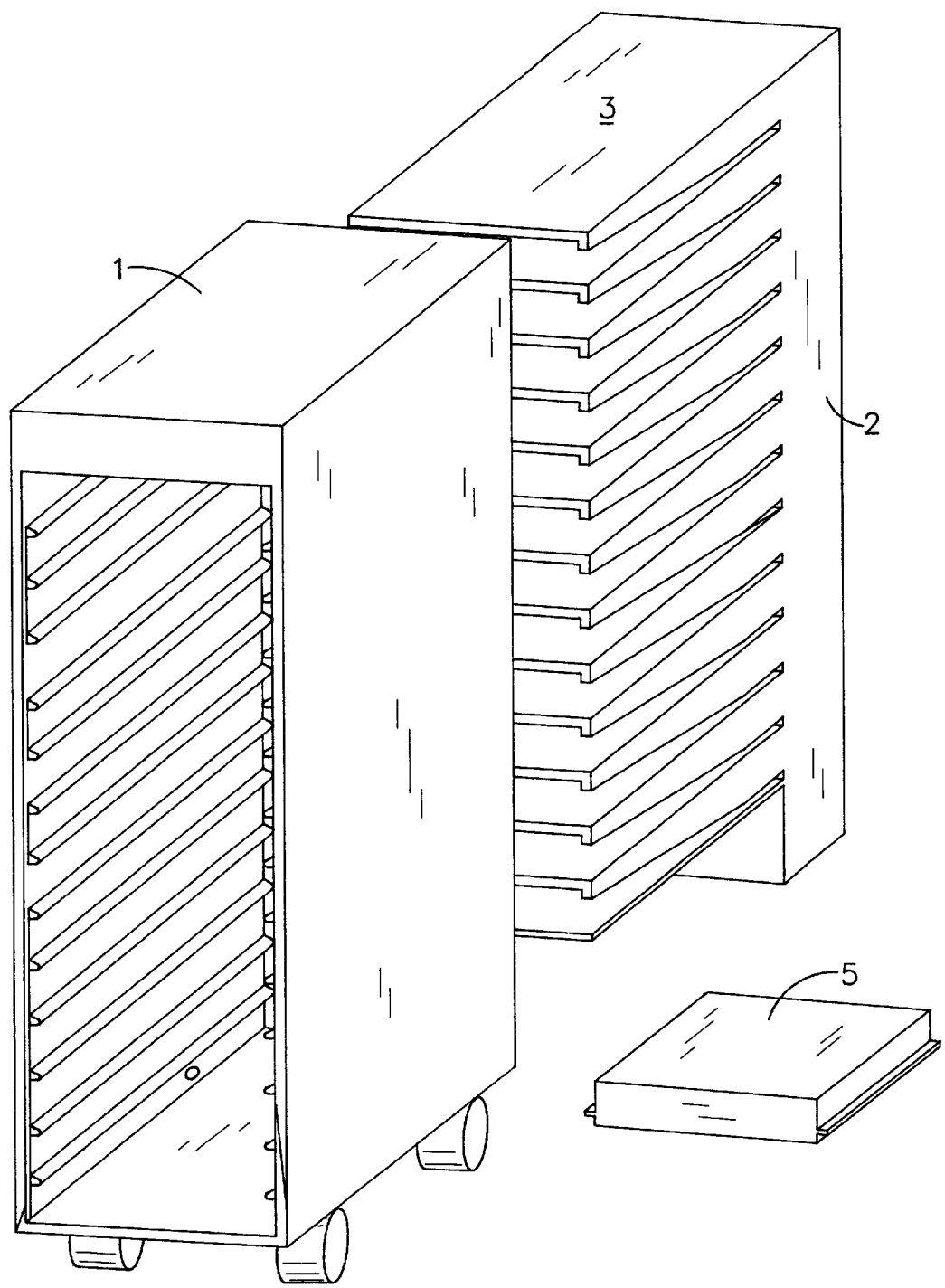
FIG. 1 shows a heating device with tongue-shaped elements, which can be introduced into an opened meal transporting cart.

Represented in FIG. 1 is a device 2 for heating prepared meals accommodated in receptacles, which device has tongue-shaped elements 3 on a plurality of levels arranged one above the other, in each of which elements at least one induction heating coil is arranged. The tongue-shaped elements 3 are dimensioned in such a way that they can be introduced into a meal transporting cart 1, in which receptacles 5 to be heated or such receptacles arranged on trays are arranged on a plurality of levels. Such receptacles may also be closed boxes. The inductive heating may again take place by receptacles suitable for this purpose or additional planar metal sheets or foils of suitable materials, as already explained in the general part of the description.

In this case, the tongue-shaped elements 3 are in this example profiled at the edge, to make an increase in stability and easier and more exact positioning of the meals to be heated possible, an asymmetric profiling additionally having favorable effects for the latter.

The tongue-shaped elements 3 may be of such a length that they cover the entire length of the meal transporting cart 1, and in this way a plurality of receptacles arranged one behind the other there, or only receptacles specifically selected and positioned with respect to the induction heating coils, are heated.

Also represented is a push-in container 5, which can be introduced into the meal transporting cart 1, and into which again other receptacles with meals to be heated can be introduced. Metallic parts which can be inductively heated may be Integrated into this push-in container 5, so that heat from above and below can be used.

Figure 2:
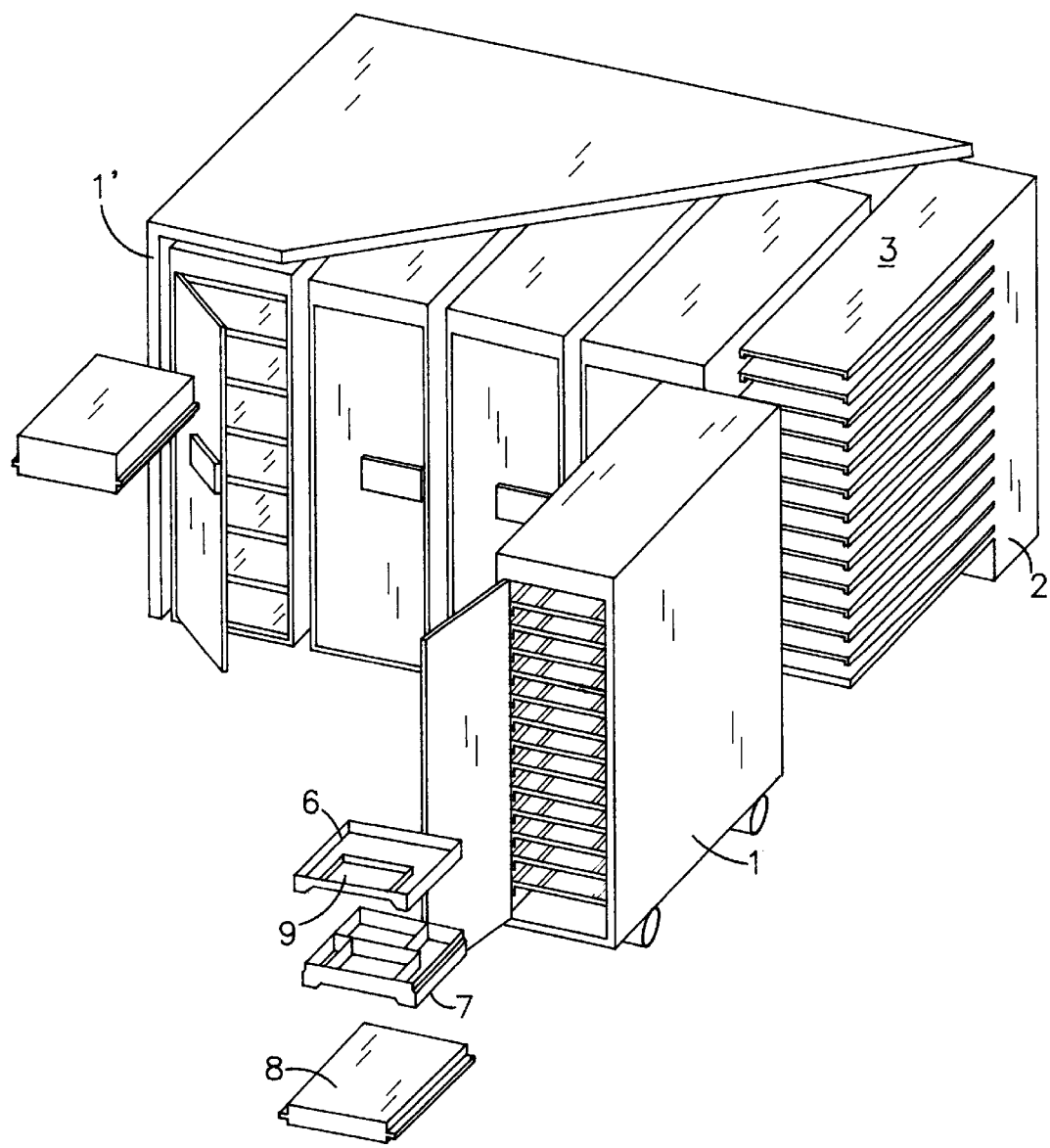
FIG. 2 shows a plurality of meal transporting carts as a battery for loading in series, with a heating device with tongue-shaped elements.

Shown in FIG. 2 is a battery of a plurality of meal transporting carts 1, which can also be used in series as a result of the short heating times which can be achieved with the invention. As a result, a heating device 2, here again with tongue-shaped elements 3, can be used for a plurality of meal transporting carts, so that it is also possible for the loading of trays to be rationalized and the required number to be reduced.

On the left in FIG. 2 there can be seen a transporting cart 1' with larger receiving boxes, which are suitable for accommodating for example duty-free articles or bottles (as a temporary store).

Represented in front of the meal transporting cart 1 provided with reference numeral 1 are various receptacles 6, 7 and 8. The receptacle 6 is in the form of a tray and is intended only for the heating. In this case it is possible to use at least one receptacle (not represented) which can preferably be covered at the top by a lid or a cover, so that generated steam can be used in the receptacle for heating and regeneration, In this case, in/on the receptacle 6 there may be metallic foil 9, which can be inductively heated, so that it is possible to dispense with special tableware, and receptacles of different materials or composites can be used.

The receptacle 7 is a box, with a multiple interior space division For separating various regions, which may be hot, cold and neutral, so that pre-loading for a portion or an entire menu is possible The lower receptacle 8 is closed and, in a way similar to in the case of a receptacle 7, a menu, items of food exclusively to be heated or else for example sauna towels or similar articles can be pre-heated.

Figure 3:
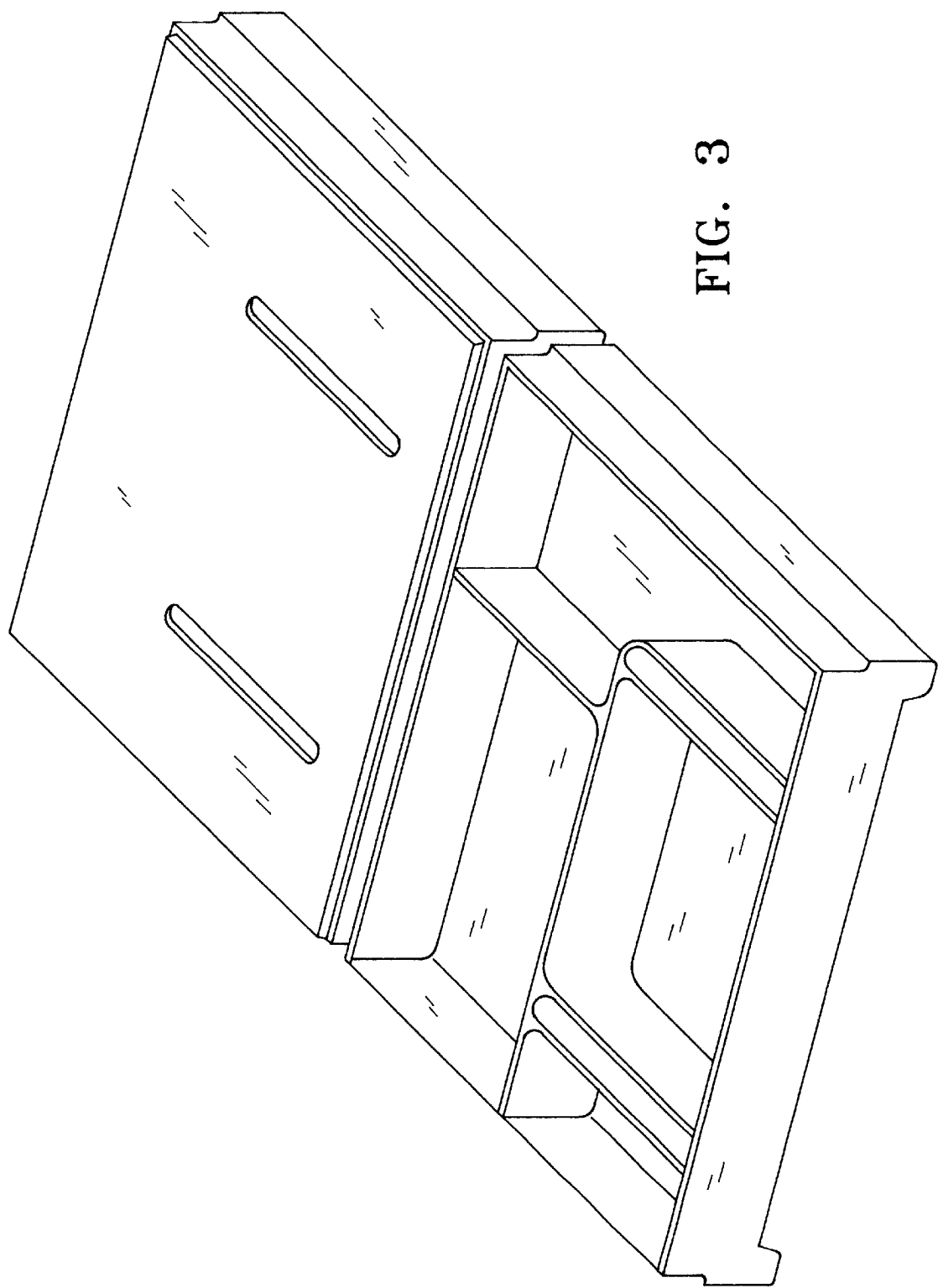
FIG. 3 shows tongue-shaped elements with various receptacles for meals and a tray.
Figure 4:
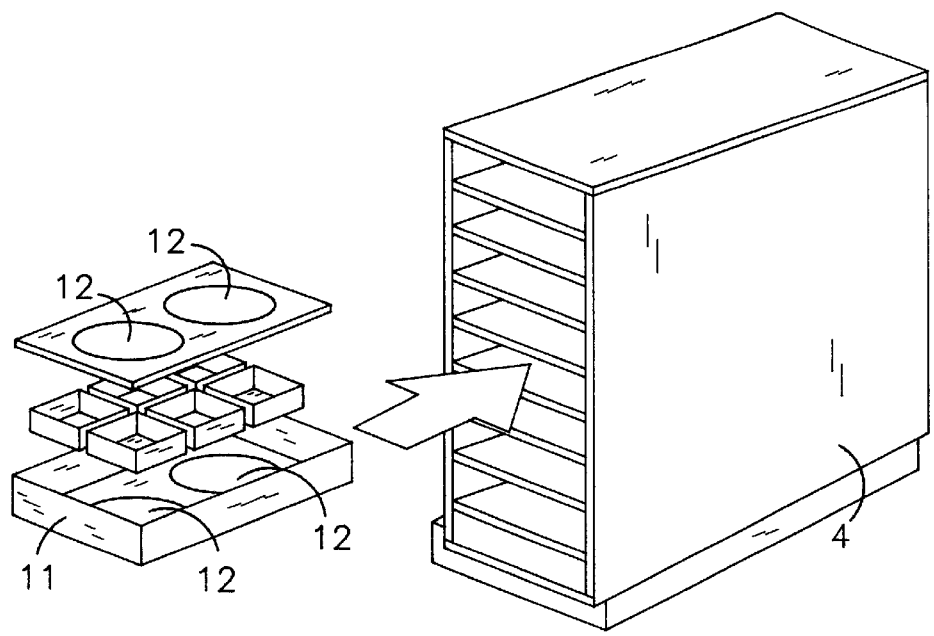
FIG. 4 shows a device for heating meals with a push-in container.

Represented in FIG. 3 are three tongue-shaped elements in conjunction with various push-in containers. In this case, the upper one is box-shaped and may contain, for example, a complete menu and be entirely or partially closed. The middle one is a closed box, and a tray is shown at the bottom Represented in FIG. 4 is a further example of a device 10 according to the invention, which can be used in a way similar to conventional ovens. In this case, push-in containers 11 which can be filled in advance can be used. In this case, conventional plates with meals can be heated in these containers, here, too, the steam generated or used having advantageous effects in conjunction with inductive heating.

The individual heat sources in the form of in this case circular metallic foils 12, with which the converted energy can be used as heat, are represented schematically in the push-in containers 11.

The electronics and the generator are favorably accommodated here in the rear part of the device 4. To facilitate maintenance and repair, however, a drawer solution, which is accessible from the front or even can be pulled out, may also be used.

Figure 5:
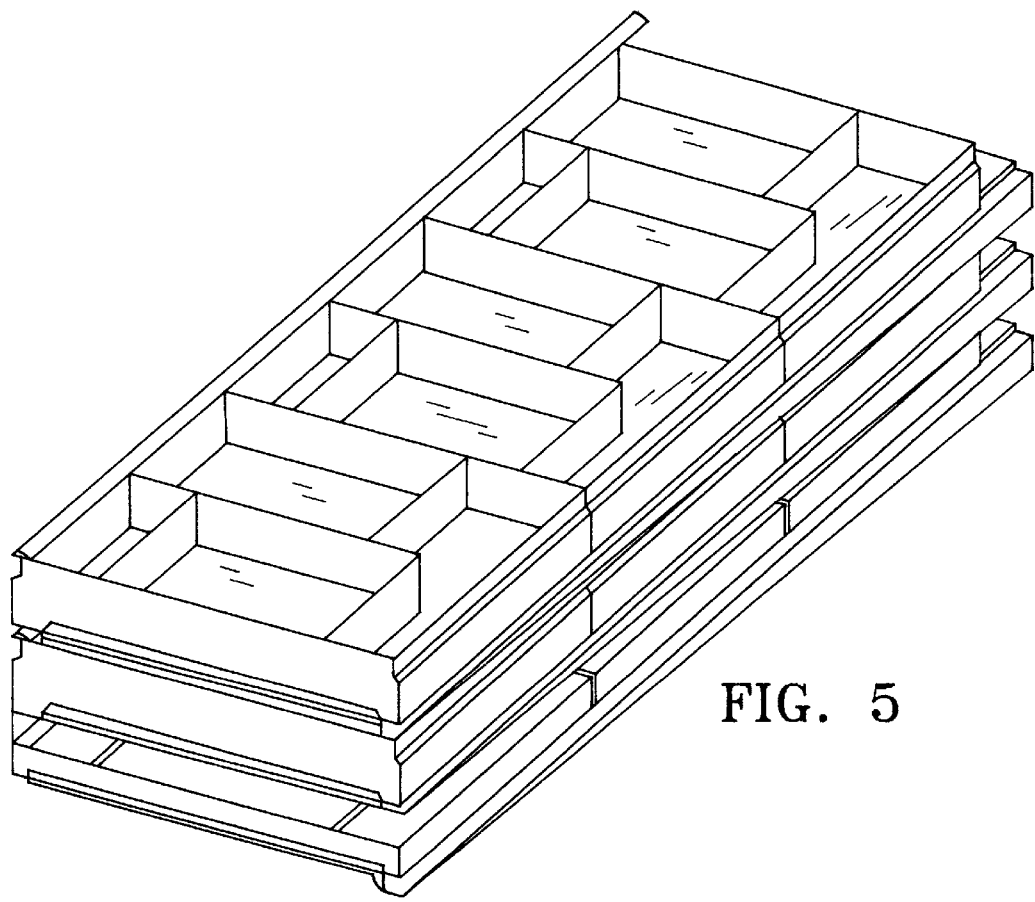
FIG. 5 shows push-in units with through-flow channels.

The example represented in FIG. 5 takes into consideration a problem which may occur if using receptacles, push-in elements or trays positioned closely together in rows and possibly also positively connected to one another temporarily (improved handling) which are arranged on a plurality of levels one above the other in a meal transporting cart. In this case, a virtually closed surface area is formed for each level and heat exchange is hindered. Since meal transporting carts are generally cooled from above, in that a compartment containing dry ice is arranged there, it may happen that the uppermost level is cooled so much that the meals are deep-frozen, the next level is frozen and the level lying thereunder is cold, to the point where no cooling can be achieved at all on the levels lying further below. This may lead to impairments, in particular of the meals arranged on the lower levels, and to serious illnesses when they are consumed.

To counteract this disadvantage and make it possible for cold also to penetrate to the lower levels, through-flow channels are formed in the push-in containers, represented here a menu box, which channels are preferably arranged around the meals to be heated or receptacles which contain such meals. With the through-flow channels, a relatively uniform cooling can be achieved in each case on one level and on the various levels.

Figure 6:
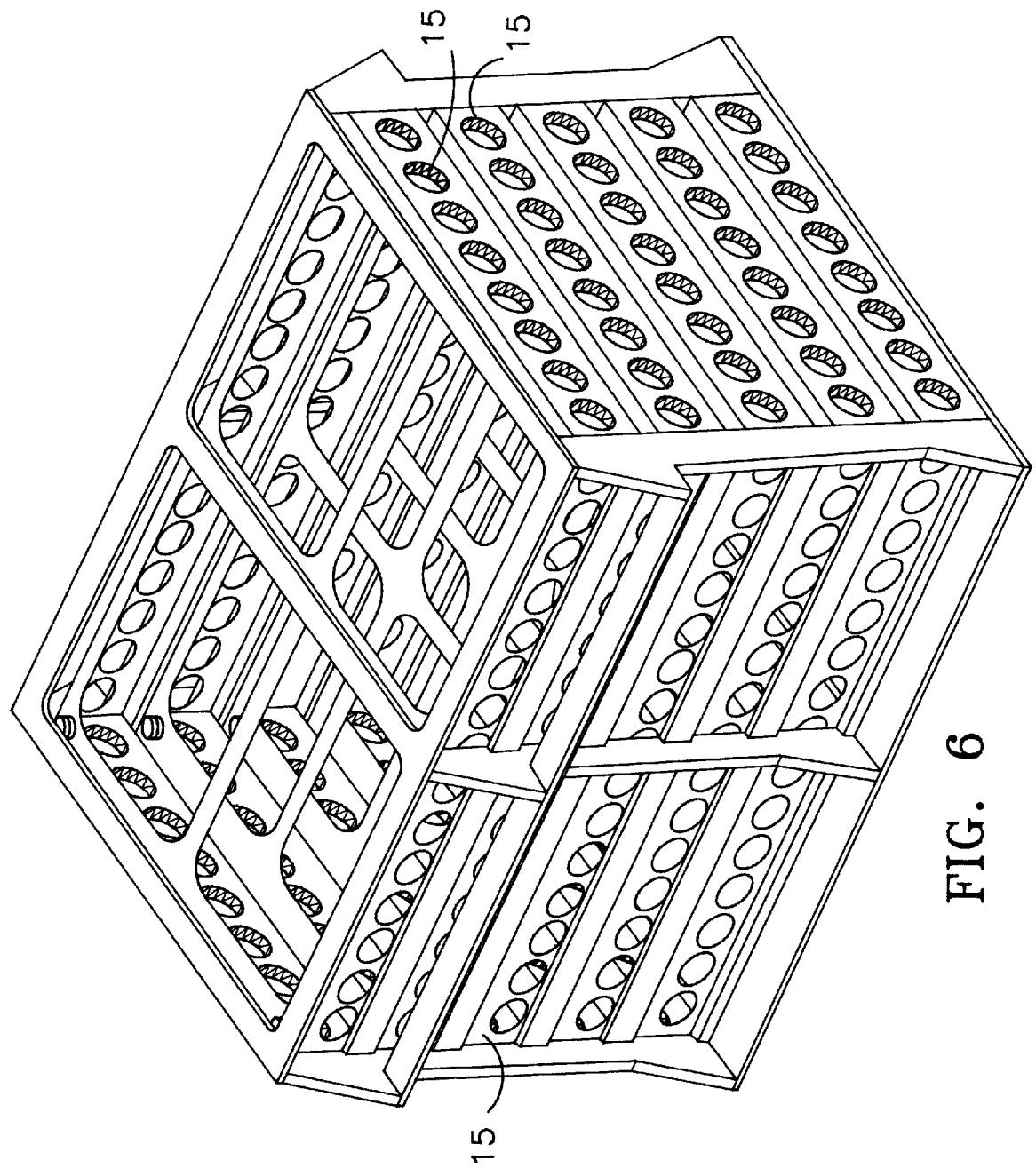
FIG. 6 shows a plurality of frame-shaped elements (racks) for accommodating receptacles, in a stacked arrangement.

In FIG. 6, a plurality of frame-shaped elements 15 (racks) are shown in a stack arrangement. These may essentially consist of a suitable plastic or for example also aluminum. Cover plates of a poorly heat-conducting material (for example wood), which can also assume a gripping function, may also be fitted.

These elements 15 primarily facilitate handling, but may also serve as adaptors for adapting the various sizes of receptacles or ovens or meal transporting carts of different sizes.

In a form not represented, lids which, by means of hinges, temporarily cover the meals accommodated in receptacles may be present on the elements 15. This may be the case in healing, storing or cooling phases. The lids may be of a one part or multi-part form, it being required that at least partially inductively heatable regions should be present on such a lid construction. The lids may also act partly as water reservoirs. The water can be evaporated via for example temporarily closable openings.

What is claimed is:

1. A process for heating pre-prepared meals accommodated in closed receptacles, the process including the steps of:
   providing induction heating coils, and
   inductively generating heat in the receptacles to cause evaporation of a meal-specific amount of water.

2. The process of claim 1 further comprising the step of:
   providing for each of the receptacles one of an at least partially open channel, tube or porous body, which comprises an electrically conducting material, filled with the meal-specific amount of water.

3. The process of claim 1 further comprising the step of:
   closing the receptacle with a lid after filling with the meal-specific amount of water.

4. The process of claim 1 further comprising the step of:
   introducing the receptacles containing the pre-prepared meals into closable push-in containers; and
   introducing the push-in containers into an oven having induction heating coils.

5. The process of claim 1 further comprising the step of:
   introducing the receptacles containing the pre-prepared meals into closable push-in containers having bases including induction heating coils; and
   introducing the push-in containers into an oven capable of heating the induction heating coils.

6. The process of either claim 4 or 5 further comprising the step of providing the meal-specific amount of water in the push-in containers.

7. The process of either claim 4 or 5 further comprising the step of providing the meal-specific amount of water in the oven.

8. The process of claim 1 further comprising the steps of:
   providing an insulated meal transporting cart with a plurality of trays holding the receptacles;
   providing a corresponding plurality of planar, tongue-shaped, fixed elements, which include the induction heating coils, at a spacing to receive the transporting cart trays; and
   locating the meal transporting cart relative to the planar, tongue-shaped, fixed elements so that the receptacles are positioned in a heating relation with the induction heating coils.

9. The process of claim 1 further comprising the step of measuring the time that the step of inductively generating heat is performed.

10. Apparatus for heating pre-prepared meals accommodated in closed receptacles, the apparatus comprising: a surface of a first selected area covering a plurality of induction coils for generating steam within the receptacles, the dimensions of the receptacles comprising an integral fraction of the first selected area so that the surface of the apparatus can be completely filled by a plurality of the receptacles.

11. The apparatus of claim 10 further comprising a meal-specific amount of water contained in each of the receptacles.

12. The apparatus of claim 11 further comprising push-in containers including bases integral with said induction coils, and reservoirs for holding the meal-specific amount of water, the reservoirs responding to eddy currents generated in the induction coils to vaporize the meal-specific amount of water into steam.

13. The apparatus of claim 12 further comprising additional induction coils situated in a top region of each push-in container, each additional induction coil having a sheet-like element lying at least there under into which eddy currents can be induced.

14. The apparatus of claim 13 wherein said sheet-like elements are at least one of: slotted and plastic-coated.

15. The apparatus of claim 12 wherein each receptacle further comprises a porous body of electrically conductive material receiving the meal-specific amount of water, the porous body being positioned such that the water evaporates in response to inductive heating of the porous body.

16. The apparatus of claim 11 wherein the receptacle further comprises a water-containing element selected from a foil and a film.

17. The apparatus of claim 10 wherein said surface of a first selected area covering a plurality of induction coils comprises tongue-shaped elements.

18. The apparatus of claim 17 further comprising a controllable frequency generator coupled to the tongue-shaped elements, the tongue-shaped elements being fixed in location.

19. The apparatus of claim 17 further comprising a tray for receiving the receptacles, each of the receptacles further comprising a covering closing the receptacles.

20. The apparatus of claim 17 wherein the tongue-shaped elements are arranged on a plurality of levels one above another.

21. The apparatus of claim 10 wherein each of the receptacles comprises edge regions including means for temporarily connecting the receptacles to each other.

22. The apparatus of claim 21 further comprising a frame-shaped element surrounding the surface of the first selected area, and wherein each of the receptacles includes a projecting edge adapted to be received by the frame-shaped element.

23. The apparatus of claim 22 wherein the frame-shaped element further comprises a lid adapted to close over the receptacles.

24. The apparatus of claim 10 wherein the receptacles comprise an electrically conductive material.

25. The apparatus of claim 10 wherein the receptacles further comprise a separation compartment for separating a portion of the pre-prepared meal to be heated from the meal-specific amount of water.

26. The apparatus of claim 10 wherein the receptacles further comprise a seal to permit at least partial evacuation of the receptacles.

27. The apparatus of claim 11 wherein the receptacles further comprise a lid and a hinge coupling the lid to the receptacle, the meal-specific amount of water being temporarily stored in the hinge.

28. Apparatus for heating pre-prepared meals accommodated in closed receptacles, the apparatus comprising:

an insulated meal transporting cart having a plurality of trays, each tray being of sufficient size to hold a plurality of the receptacles containing the pre-prepared meals;

a plurality of planar, tongue-shaped elements, positioned at a fixed location at a spacing to receive the transporting cart and trays, each of the planar elements including induction heating coils situated at a spacing coordinated with the spacing of the receptacles in the trays;

each of the receptacles including a reservoir for holding a meal-specific amount of water, the reservoir being adapted to respond to eddy currents generated by the induction coils to vaporize the meal-specific amount of water into steam to heat pre-prepared meals accommodated in the closed receptacles.

* * * * *